Jan. 7, 1941.  W. KOEHLER  2,228,120

PORTABLE DRY BATTERY BURGLAR ALARM

Filed Sept. 17, 1938

INVENTOR
William Koehler
BY
ATTORNEY

Patented Jan. 7, 1941

2,228,120

UNITED STATES PATENT OFFICE 2,228,120

PORTABLE DRY BATTERY BURGLAR ALARM

William Koehler, New York, N. Y.

Application September 17, 1938, Serial No. 230,423

5 Claims. (Cl. 200—161)

This invention relates to new and useful improvements in a portable dry battery burglar alarm.

The invention has for an object the construction of a burglar alarm as mentioned which is characterized by a small casing containing an electric alarm, batteries, and a circuit for controlling the ringing of the alarm when an insulation member is drawn outwards, and an arrangement by which the casing may be attached to a bed, or other article of furniture, or other object. The invention contemplates the use of cords attached to the insulation member and extended in various directions and attached to various objects likely to be moved by an intruder.

The invention proposes to so arrange the device that when any one of the cords is pulled the alarm is set into operation.

Still further the invention relates to a novel construction of insulation member to adapt it to securely maintain its position and to be extendible only upon the pulling of one of the cords before mentioned.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 6:
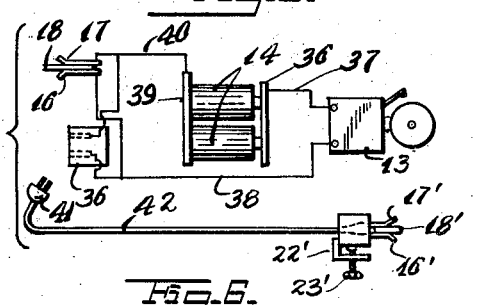
Fig. 6 is a schematic wiring diagram of the device.

The portable dry battery burglar alarm, according to this invention, includes a casing 10 having an open side closable with a cover 11 which is hingedly mounted on one edge by hinges 12. Within the casing there is an electric alarm 13 and batteries 14 for the operation of the alarm. The casing 10 is formed with an opening 15 in one end through which a pair of contacts 16 and 17 project. One of these contacts, the contact 17, is flexible and biased to normally engage the contact 16 and is adapted to be flexed from the contact 16 by the engagement of an insulation member hereinafter to be described between the contacts 16 and 17. There is a circuit within the casing which includes the contacts 16 and 17 for controlling the said alarm to operate when the contacts engage each other. This circuit is schematically shown in Fig. 6 and will be explained in detail hereinafter.

An insulation member 18 is normally interposed between the contacts 16 and 17 for holding them apart. A latch is associated with the insulation member 18 and includes a movable bolt 19, and an operator 20 for opening the latch by controlling the bolt 19. A plurality of cords 21 are attached to the operator 20 and are adapted to be extended to various objects to be moved to set off the alarm as hereinafter more fully described.

Figure 1:
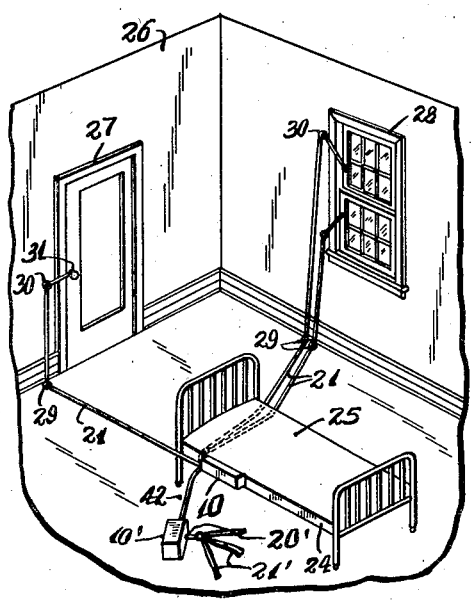
Fig. 1 is a perspective view of a room with certain articles therein, and a portable dry battery burglar alarm constructed according to this invention arranged therein.
Figure 2:
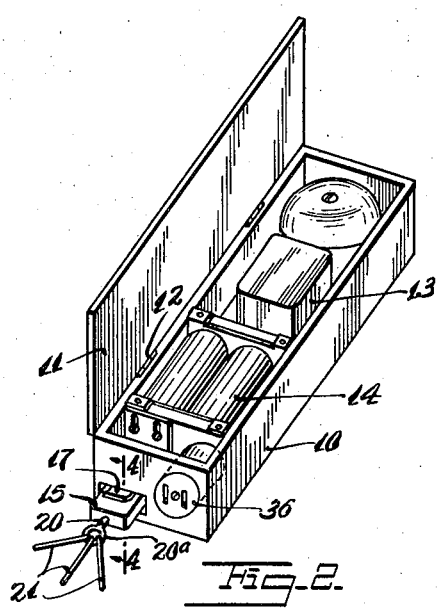
Fig. 2 is a perspective view of the casing and the associated parts of the burglar alarm illustrated with the cover casing in an open position.
Figure 3:
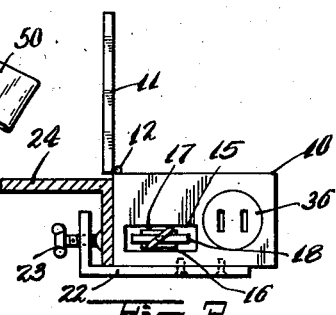
Fig. 3 is an end elevational view of Fig. 2 but illustrated with the casing attached to one of the rails of a bed, the latter part being illustrated in section.
Figure 5:
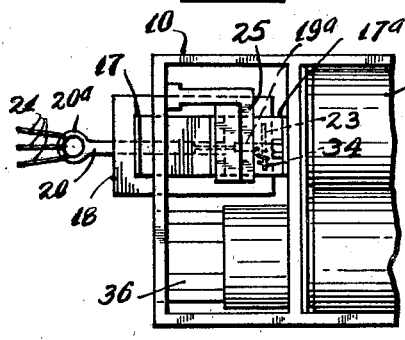
Fig. 5 is a fragmentary plan view looking in the direction of the line 5—5 of Fig. 4.
Figure 7:
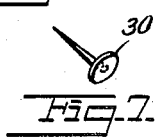
Fig. 7 is a perspective view of a tack used in the device.
Figure 8:
Fig. 8 is a perspective view of an eye element used in the device.

The casing 10 is provided with a bracket 22 and a clamp screw 23 by which the casing may be attached to some article of furniture or other object, but the device may be placed at any location in the room, facing the windows, doors, or other objects, without being screwed or otherwise attached to any object, since the weight of the device will keep it in place without moving it when the cord is pulled. As illustrated in Figs. 1 and 3 the clamp 23 is engaged upon one rail 24 of a bed 25. This bed is shown within a room 26. There is a door 27 in one of the walls of the room. There is a window 28 in another wall of the room. The cords 21 extend from the operator 20 and are connected to various objects guarded by the alarm. For example, one cord 21 (see Fig. 1) extends to and is connected with the door 27. This cord 21 extends through a tack 29 having an eye opening (see Fig. 8) which is engaged into the floor of the room near the wall having the door 27. The cord 21 then extends upwards over a thumb tack 30 (see Fig. 7), and then is connected with the knob 31 of the door. The parts are so arranged that when the door is opened the cord 21 will be pulled. Thus the operator will be pulled.

Other cords 21 (see Fig. 1) extend to the sashes of the window 28. These cords are guided over suitable tacks with eye openings and thumb tacks, and are attached to the sashes in a manner so that when one or the other of the sashes is moved the cord or cords will be pulled and cause the pulling of the operator 20. While the cords have been shown connected merely with the door and window of the room, it should be understood that these cords, or other similar cords, may be connected with other objects in the room which are most likely to be moved by an intruder.

Figure 4:
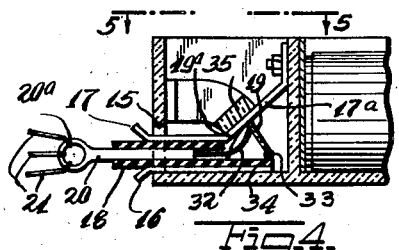
Fig. 4 is a fragmentary longitudinal sectional view taken on the line 4—4 of Fig. 2.

The insulation member is of flat construction and is provided with a bore through which the operator 20 extends. The outer end of the operator is provided with a ring portion 20ª to which the cords 21 are attached. The inner end of the operator 20 connects with a flexible wire 32, the other end of which is connected with an outer portion of the bolt 19. The inner end of the bolt 19 is hingedly mounted by a pintle 33. A spring 34 is coaxially arranged upon the pintle 33 and has one end connected with the bolt and the other with a portion of the insulation member 18 so as to normally urge the bolt 19 into the normal position shown in Fig. 4. This position is one in which it is at an angle of approximately 45° to the member 18. In this position of the bolt it rests against an inclined portion 17ª of the contact 17. Behind this inclined portion 17ª there is a backing bracket 35 which holds the contact portions 17ª from flexing outwards. The bolt 19 is of insulation material.

The insulation member 18 if pushed or pulled, cannot be withdrawn from its position between the contacts 16 and 17 because the bolt 19 locks the same. In order for the insulation member to be withdrawn it is necessary that the operator 20 be pulled. This will pull the flexible wire 32, which in turn will pivot the bolt 19 along the dot and dash line 19ª. When the bolt moves along this line it will soon reach a position in which it is beneath the contact 17ª. The insulation member, upon further pulling of the operator 20, will be drawn out from its position between the contacts.

The insulation member 18 may be inserted back to its original position merely by forcing it inwards between the contacts 16 and 17. During this movement the bolt 19 will be normally pressed downwards until the member 18 is fully inserted, and then the bolt 19 will automatically pivot upwards to the position shown in Fig. 4. A plug socket 36 is also mounted in one wall of the casing 10. This socket is adapted to receive a plug as hereinafter more fully described.

The wiring of the device may be understood by inspecting Fig. 6. The batteries 14 have their end contacts connected with a conductor 36. A lead 37 connects the conductor 36 with one terminal of the alarm 13. The other terminal of the alarm is connected by a lead 38 with one terminal of the plug 36 and with the contact 16. A conductor plate 39 is in contact with the shell contacts of the batteries 14 and connects with a lead 40 which is connected with the contact 17 and with the other contact of the plug 36. The insulation member 18 is engaged between the contacts 16 and 17.

Normally, the alarm 13 does not operate. When the insulation member 18 is withdrawn the contacts 16 and 17 engage and then the circuit is completed through the alarm 13 which rings until either the batteries 14 become exhausted, or the circuit is broken by re-engaging the insulation member 18 between the contacts 16 and 17.

A plug 41 is adapted to be engaged in the socket 36. This plug is connected with a double wire cable 42 which has one of its wires connected with a contact 17' and its other wire connected with a contact 16'. An insulation member 18' is adapted to hold the contacts 16' and 17' separated. The contacts 16' and 17' are mounted upon a casing 10' which is provided with a bracket 22' having a clamp screw 23'. The casing 10' may be attached to an object by the clamp screw 23'. The plug 41 may be plugged into the socket 36. As long as the contacts 16' and 17' are separated by the member 18' the alarm will not operate. Should the member 18' be withdrawn, the alarm operates. The member 18' is similar in construction to the member 18. It has an operator 20', see Fig. 1, and is adapted to have cords 21' associated therewith, in a like manner. Thus the cords 21' may control the withdrawal of the member 18'. The advantage of having the cable 42, resides in the fact that the cable may be strung to a remote point from the casing 10, to an object to which the cords 21' are connected. Therefore the cords 21' may be of relatively shorter length than would be required should it be necessary to string the cords directly to the operator 20.

Figure 9:
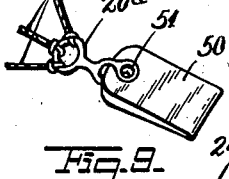
Fig. 9 is a perspective view of another insulation member constructed in accordance with this invention.

In Fig. 9 the insulation member 50 is shown to be of a single piece of sheet material with a ring portion 20ª secured thereon with an eyelet 51, rivet or the like so that the ring 20ª may swivel on the insulation member 50, in the direction of the pull of the cord 21.

It is to be understood that this device may be attached to any object or on the floor at any place of a room or may be free to move from place to place.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a device of the class described, a switch for controlling the sounding of an electric alarm, comprising a pair of biased engageable contacts, an insulation member engageable between said contacts for separating the same, a latch member on said insulation member to prevent the removal of said insulation member from between said contacts, means for releasing said latch operable by a movable operator, and a cord attached to said operator whereby when said cord is pulled said operator will move to release said latch member so that further pulling of said cord will cause said insulation member to be withdrawn from between said contacts.

2. In a device of the class described, a switch for controlling the sounding of an electric alarm, comprising a pair of biased engageable contacts, an insulation member engageable between said contacts for separating the same, a latch member on said insulation member to prevent the removal of said insulation member from between said contacts, means for releasing said latch operable by a movable operator, and a cord attached to said operator whereby when said cord is pulled said operator will move to release said latch member so that further pulling of said cord will cause said insulation member to be withdrawn from between said contacts, said latch member comprising a bolt having one of its ends pivotally mounted on said insulation member, and resilient means urging said bolt into a position in which it will engage beneath one of said contacts to lock said insulation member in position between said contacts.

3. In a device of the class described, a switch for controlling the sounding of an electric alarm, comprising a pair of biased engageable contacts, an insulation member engageable between said contacts for separating the same, a latch member on said insulation member to prevent the removal of said insulation member from between said contacts, means for releasing said latch operable by a moving operator, and a cord attached to said operator whereby when said cord is pulled said operator will move to release said latch member so that further pulling of said cord will cause said insulation member to be withdrawn from between said contacts, said latch member comprising a bolt having one of its ends pivotally mounted on said insulation member, and resilient means urging said bolt into a position in which it will engage beneath one of said contacts to lock said insulation member in position between said contacts, said means, comprising a flexible wire having one of its ends attached to the free end of said bolt, said operator being slidably extended through said operator and having its inner end attached to the free end of said flexible wire to cause said operator, bolt and insulation member to move as a unit from between said contacts when said latch member is released.

4. In a device of the class described, a switch for controlling the sounding of an electric alarm, comprising a pair of contacts resiliently engaging each other and one of which is flexible, a tubular insulation member engaging between said contacts to separate the same, a latch for holding said insulation member in position between said contacts, and means for releasing said latch so that said insulation member may be withdrawn from between said contacts, said latch comprising a bolt having one of its ends pivotally mounted on said insulation member, and resilient means urging said bolt into a position in which it will engage beneath one of said contacts to lock said insulation member in position between said contacts.

5. In a device of the class described, a switch for controlling the sounding of an electric alarm, comprising a pair of contacts resiliently engaging each other and one of which is flexible, a tubular insulation member engaging between said contacts to separate the same, a latch for holding said insulation member in position between said contacts, and means for releasing said latch so that said insulation member may be withdrawn from between said contacts, said latch comprising a bolt having one of its ends pivotally mounted on said insulation member, and resilient means urging said bolt into a position in which it will engage beneath one of said contacts to lock said insulation member in position between said contacts, said means, comprising an operator slidably extending through said tubular insulation member, a flexible wire having one of its ends connected to the inner end of said operator and the other of its ends connected to the free end of said bolt, and a cord attached to the outer end of said operator and pullable to pivot said bolt to a position parallel to said insulation member to free said insulation member so that further pulling on said cord will cause said insulation member and bolt to be withdrawn as a unit from between said contacts so that said contacts will engage each other.

WILLIAM KOEHLER.